United States Patent [19]
Kempf et al.

[11] Patent Number: 5,538,118
[45] Date of Patent: Jul. 23, 1996

[54] ELECTRO-MECHANICAL INDEXING CLUTCH & METHOD

[75] Inventors: Mark A. Kempf, Inver Grove Heights; Anthony M. Harrison, Forest Lake, both of Minn.

[73] Assignee: Reell Precision Manufacturing Corporation, St. Paul, Minn.

[21] Appl. No.: 326,006

[22] Filed: Oct. 19, 1994

[51] Int. Cl.⁶ .............................. F16D 43/26; F16D 27/00
[52] U.S. Cl. .................. 192/33 C; 192/30 W; 192/84 R; 192/84 T; 74/813 C
[58] Field of Search ................. 192/33 R, 33 C, 192/84 R, 84 T, 84 P, 30 W, 125 A, 127, 81 C; 74/813 C, 814

[56] References Cited

U.S. PATENT DOCUMENTS

| | | | |
|---|---|---|---|
| 2,129,847 | 9/1938 | Knodel | 192/84 P |
| 3,048,253 | 8/1962 | Oldenburg et al. | |
| 3,185,276 | 5/1965 | Sajovec, Jr. | |
| 3,471,842 | 10/1969 | Kuehnle | 192/33 R X |
| 3,587,811 | 6/1971 | Smith et al. | |
| 3,602,348 | 8/1971 | Mohr | 192/127 |
| 3,741,357 | 6/1973 | Krysink et al. | 192/127 X |
| 3,820,646 | 6/1974 | Lombardi | |
| 3,877,274 | 4/1975 | Wahlstedt | |
| 3,926,286 | 12/1975 | Johnson | |
| 3,974,902 | 8/1976 | Wahlstedt et al. | |
| 4,189,039 | 2/1980 | Johnson | |
| 4,191,283 | 3/1980 | Keeny, III | |
| 4,263,995 | 4/1981 | Wahlstedt | |
| 4,373,620 | 2/1983 | Zlotek | |
| 4,538,717 | 9/1985 | Blohm et al. | 192/33 R X |
| 4,638,899 | 1/1987 | Kossett | |
| 4,707,154 | 11/1987 | Arai | |
| 4,788,856 | 12/1988 | Felger | |
| 4,971,466 | 11/1990 | Kondo | |
| 5,109,969 | 5/1992 | Blaser | 192/84 R |
| 5,133,437 | 7/1992 | Larson | |
| 5,251,737 | 10/1993 | Flotow et al. | |
| 5,285,950 | 2/1994 | Zlotek | |

*Primary Examiner*—Richard M. Lorence
*Attorney, Agent, or Firm*—Merchant, Gould, Smith, Edell, Welter & Schmidt

[57] ABSTRACT

An electromagnetically actuated clutch having an integrated sensor activated control circuit for selectively engaging and disengaging the clutch.

12 Claims, 8 Drawing Sheets

ELECTRO-MECHANICAL INDEXING CLUTCH & METHOD

BACKGROUND OF THE INVENTION

The present invention relates to an electromagnetically actuated spring clutch having an integrated sensor activated control circuit for selectively engaging and disengaging the clutch.

Electromagnetically actuated spring clutches are useful components in machines such as photocopiers, etc. for causing precise angular and linear movements of various moving parts in machines. For example spring clutches might be used for positive positioning of parts, two speed transmissions, reversing applications, paper registrations, paper feeding and cam positioning.

There are several different embodiments of spring clutches. In one embodiment the clutch is normally engaged. For example in U.S. Pat. No. 3,926,286, to disengage the clutch, the spring is released from its initial driving contact with the input hub by means of an exterior floating sleeve which contacts the free end of the spring. Stopping rotation of the sleeve expands or unwraps the spring so that torque is no longer transmitted to the output hub whereby the clutch is no longer engaged.

In yet another embodiment of a spring clutch, the clutch is normally disengaged. For example in U.S. Pat. No. 3,185,276, the action of a sleeve is employed to initiate wrap down of the spring rather than release of the spring. Wrap down of the spring causes the clutch to become engaged. These are but a few of the many examples of spring clutches.

Electromagnetically actuated spring clutches employ an electromagnetic coil to control the release and/or wrap down of the spring. One such normally disengaged electromagnetically actuated wrap spring clutch is shown in U.S. Pat. No. 4,263,995, where a wrap spring is caused to wrap down onto input and output hubs by a magnetic field acting between a control ring and an adjacent shoulder ring affixed to the output hub and forming a section of the flux path. The remaining sections defining the magnetic flux path and enclosing the electromagnetic coil are fixed in position, only the two rings being rotatable. The magnetic field is caused by energization of the electromagnetic coil. U.S. Pat. No. 5,133,437 shows a similar electromagnetically actuated spring clutch which includes a brake.

Oftentimes it is necessary to effect indexing of the spring clutch output member to a plurality of angularly spaced positions and/or revolutions of the clutch. U.S. Pat. No. 4,191,283 is an example of a normally engaged mechanically indexed spring clutch. In this patent, a solenoid actuated interposer mechanically engages a rotatable member of the spring clutch to stop the rotatable member in a plurality of positions, thereby disengaging the clutch.

Existing methods of indexing spring clutches often have many drawbacks and undesirable features. For example, currently available indexing spring clutches typically are rather bulky and take up precious space. Moreover, they have many additional working parts which adds to their expense of manufacture, assembly and installation. Many designs do not readily provide for returning to a home position. In slow input speed and/or high friction load applications, the normally engaged, mechanically indexed spring clutches often exhibit wear due to insufficient over run which results in the spring being only partially disengaged, thereby causing premature failure.

These are but some of the problems associated with existing indexing clutches.

SUMMARY OF THE INVENTION

The present invention relates to an electromagnetically actuated clutch apparatus, comprising integral sensor activated control means for engaging/disengaging of the clutch.

In one embodiment, the sensor providing signals to the integral control means representative of a sensed position is integral with the control means.

In one embodiment, the clutch is a spring wrap type of clutch which is normally disengaged.

In one embodiment, the sensor is a magnetic field sensor. In yet one embodiment, the home position is detected by the magnetic sensor sensing a different magnetic field polarity.

These and various other features and advantages of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

Referring now to the drawings in which like reference numerals indicate generally corresponding parts throughout the several views.

DETAILED DESCRIPTION OF A PREFERRED EMBODIMENT

Referring now to the FIGS. 1–4, there is shown a preferred embodiment of an electro-mechanical indexing clutch in accordance with the principles of the present invention, the clutch being generally referred to by the reference numeral 40. The preferred embodiment of the indexing clutch 40 shown includes an electromagnetic spring clutch 42 and a sensor activated control circuit enclosed within a housing 44 which is mounted on the clutch 42 and electrically connected to a magnetic coil (not shown) of the clutch 42. In the embodiment shown, the spring clutch 42 is an electromagnetic spring wrap clutch as generally shown in U.S. Pat. No. 4,263,995; hereby incorporated by reference. However, it will be appreciated that the present invention might be used with other types of electromagnetic clutches including wrap spring, friction disk, magnetic particle, & hysteresis.

Figure 1:
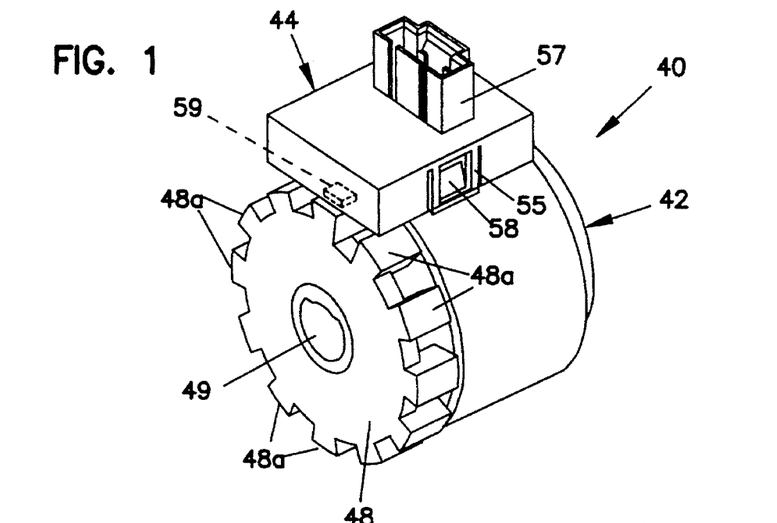
FIG. 1 is a perspective view of an embodiment of a clutch apparatus in accordance with the principles of the present invention.
Figure 2:
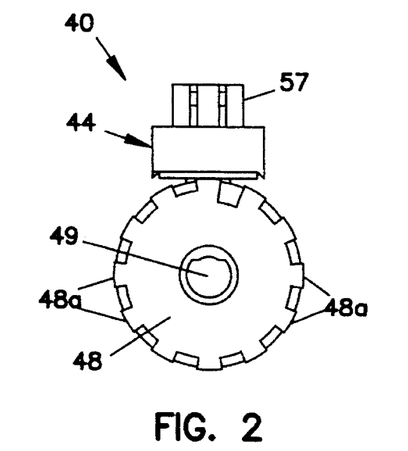
FIG. 2 is an end view of the clutch shown in FIG. 1.
Figure 3:
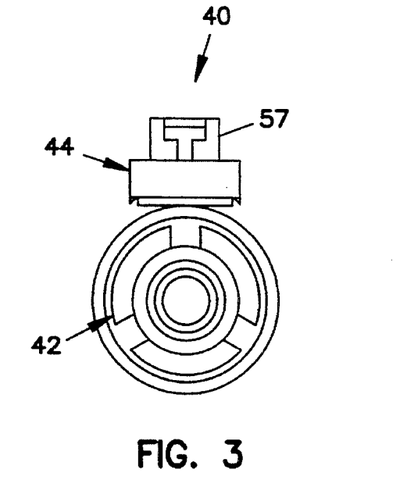
FIG. 3 is an opposite end view of the clutch shown in FIG. 1.
Figure 4:
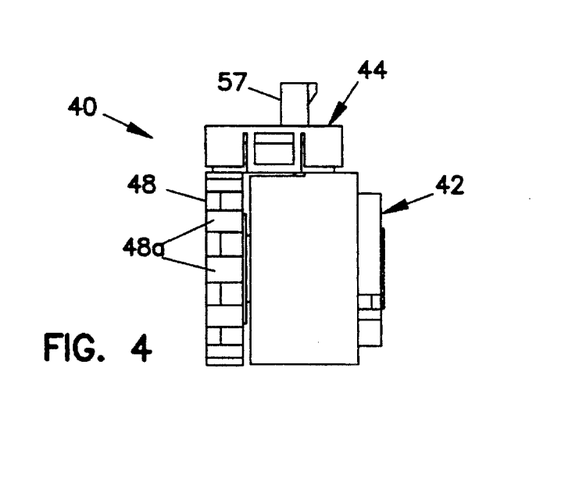
FIG. 4 is a side elevational view of the clutch apparatus shown in FIG. 1.
Figure 5:
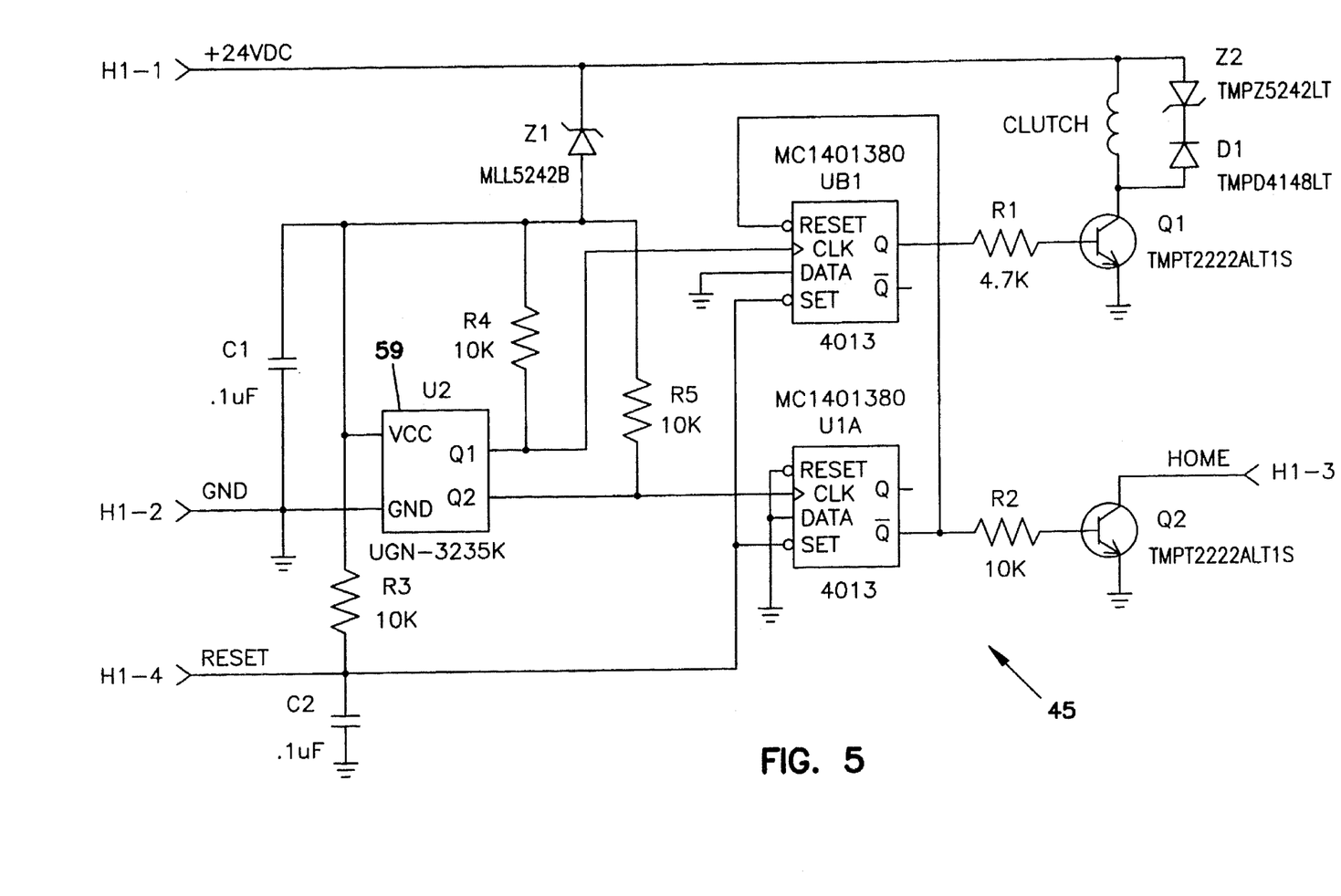
FIG. 5 is a schematic diagram of an embodiment of a control circuit in keeping with the principles of the present invention.
Figure 6:
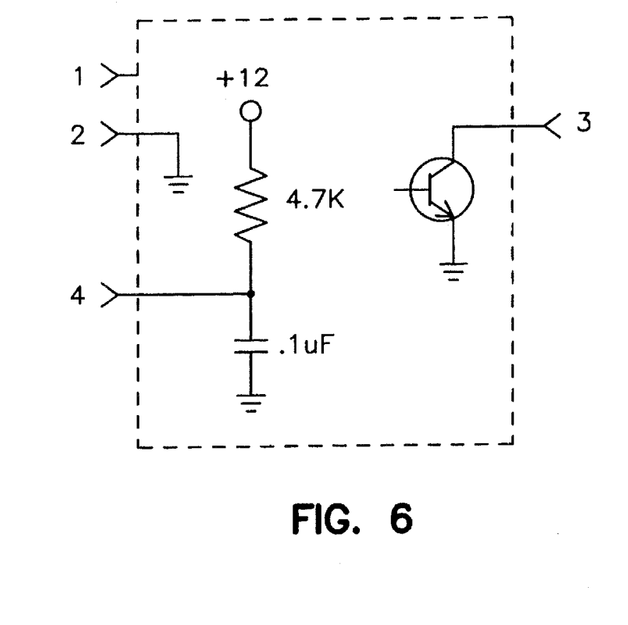
FIG. 6 is an electrical signal/block diagram of an embodiment of the clutch control circuit interface with a remote master control unit.
Figure 7:
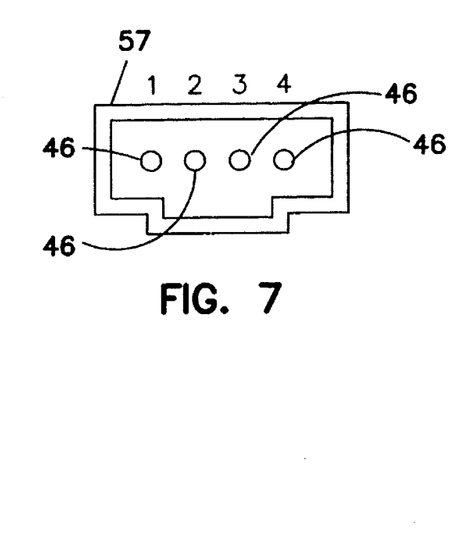
FIG. 7 is a top view of an embodiment of the electrical four pin electrical connector which is used to interconnect the clutch control circuit to the master control unit.
Figure 8:
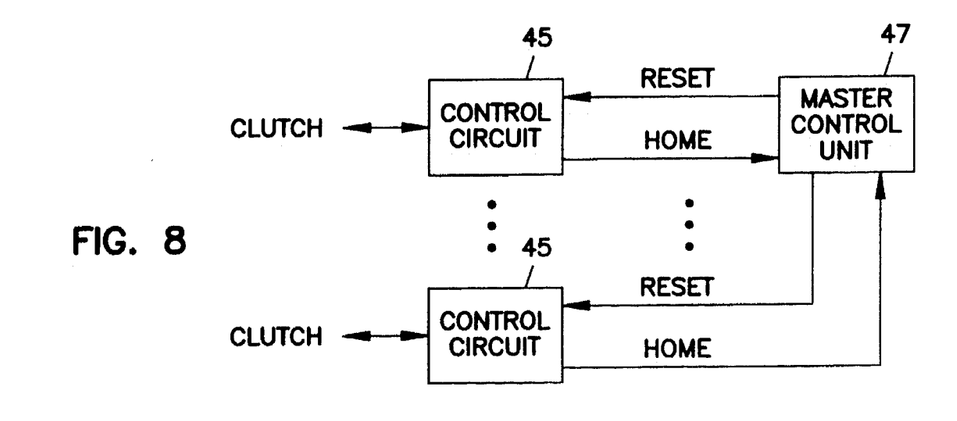
FIG. 8 is diagrammatic view illustrating the master control unit interfacing with a plurality of clutch control circuits.

Shown in FIGS. 5–7, is an embodiment of a control circuit 45 enclosed in the housing 44 which controls engagement/disengagement of the clutch 42. As shown in FIG. 7, four pins 46 provide for electrical connection of the control circuit 45 to a remote master control unit 47. The master control unit might be controlling the overall operation of the equipment where one or more of the indexing clutches 40 are being used. Indeed, the master control unit 47 will most likely be interfaced to a plurality of the control circuits 45 and their associated clutches as is illustrated in FIG. 8.

Illustrated in FIG. 6, is the four pin interface with the control circuit 45 wherein pin 1 is 24 volts direct current (VDC) supply voltage; pin 2 is ground, pin 3 is home signal (low when home position detected by the control circuit 45), and pin 4 is a reset or clutch engagement signal (normally low, active high).

Figure 9A:
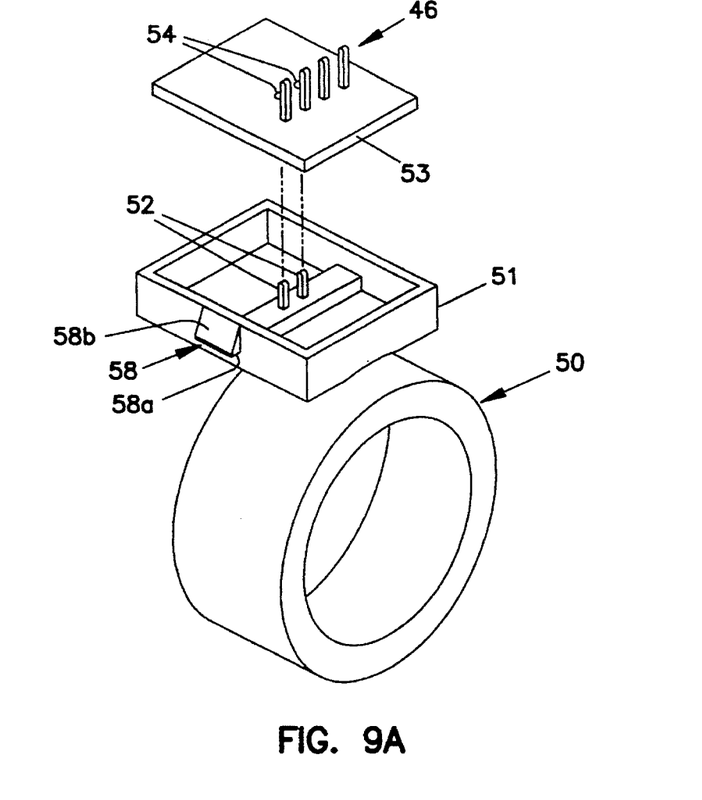
FIGS. 9A, 9B are perspective and sectional views of an embodiment of an electromagnetic coil housing utilized with the embodiment of the clutch shown in FIG. 1, a control circuit board being shown removed from the housing in FIG. 9A and being inserted in the housing in FIG. 9B.
Figure 9B:
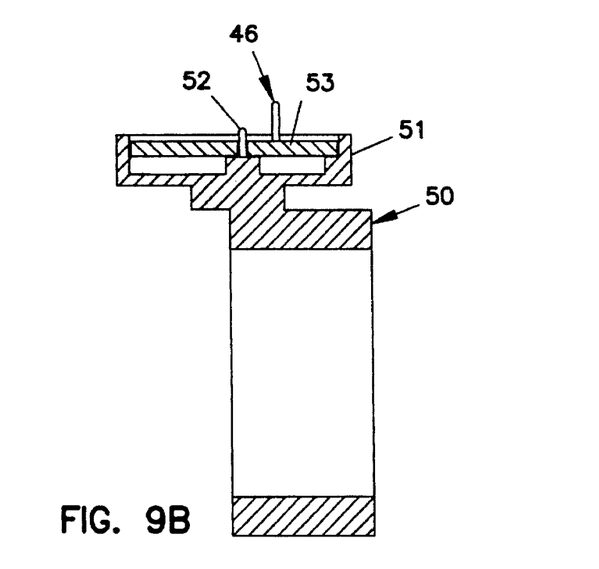

Referring now to FIGS. 9A, B and FIGS. 10A, B, C, an embodiment of mounting the control circuit 45 on the clutch 42 will be described. As shown in FIGS. 9A, B, the electromagnetic coil is contained in a coil housing 50 which has a generally rectangular housing portion 51. Two terminal pins 52 electrically connected to the electromagnetic coil extend into the housing portion 51. The control circuit 45 is disposed on a circuit board 53 which has apertures 54 for receiving the terminal pins 52. Upon insertion of the circuit board 53 into the housing portion 51, the terminal pins 52 are soldered onto appropriate contacts of the control circuitry 45 on the circuit board 53. The four pins 46 project upward from the circuit board 53.

Figure 10A:
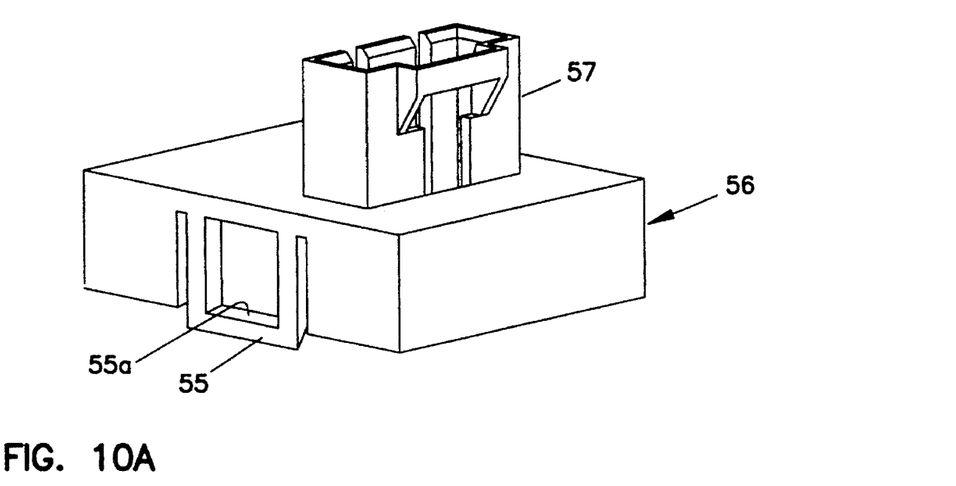
FIGS. 10A, 10B, 10C are perspective, side elevational, and sectional views of an embodiment of an electromagnetic coil housing cap which fits over the coil housing and encloses the control circuit board disposed in the coil housing.
Figure 10B:
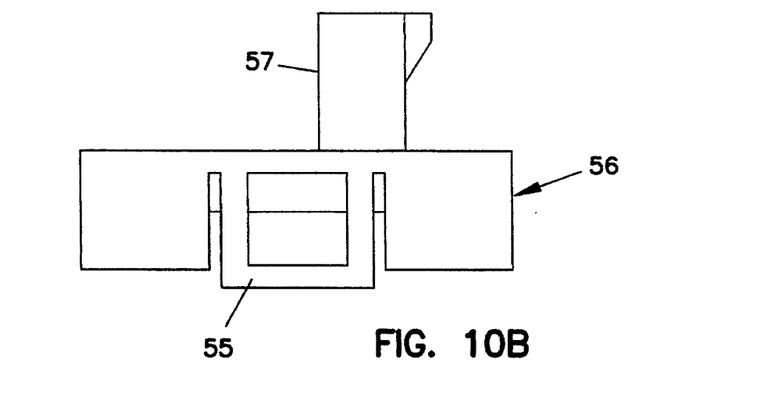
Figure 10C:
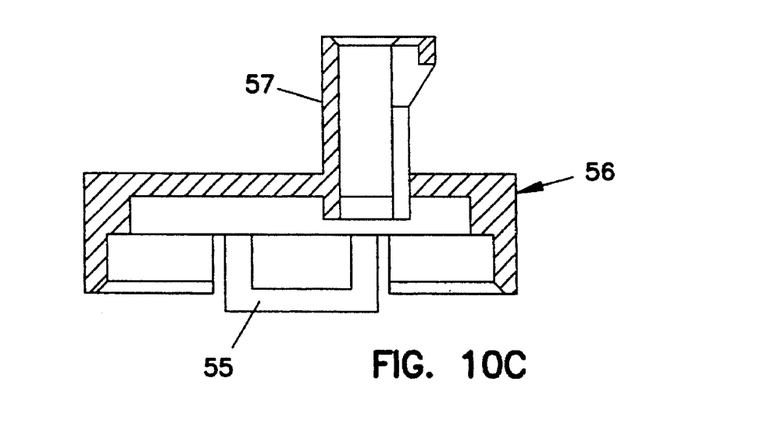

An embodiment of a coil housing cap 56 is shown in FIGS. 10A, B, C. The coil housing cap 56 is configured to snap fit onto the coil housing 50 so as to form the housing 44 enclosing the control circuitry 45. The coil housing cap 56 includes two resilient side snaps 55, on opposite sides of the coil housing cap 56, configured to engage side members 58 on the coil housing portion 51 and thereby retain the coil housing cap 56 in place. Upon insertion of the coil housing cap 56 over the coil housing portion 51, the side snaps 55 are biased outward by an inclined surface 58b of the side members 58 until an upper edge 55a of the side snaps 55 slides by a lower edge 58a of the side members 58 whereupon the upper edge 55a engages the lower edge 58a. The coil housing cap 56 has an electrical housing 57 aligned with the four pins 46 on the circuit board 53 such that upon insertion of a corresponding 4-pin electrical connector from the master control unit 47, proper electrical connection is made.

Referring now to FIGS. 1–4 and 11A–C, press fit onto a driven shaft 49 of the clutch 42 for rotation therewith, is a disk member 48 having one or a plurality of spaced apart magnetic regions 48a disposed about an outer periphery of the disk member 48. A preferred embodiment of the disk member 48 is molded from Nylon 6 material with strontium ferrite embedded therein. The magnetic regions are oriented radially. The disk is initially manufactured in a demagnetized state and is then magnetized prior to being press fit onto the driven shaft 49. In other embodiments, a plastic disk member 48 might be used with magnets disposed in the plastic disk member 48 about its periphery at desired locations.

Figure 11A:
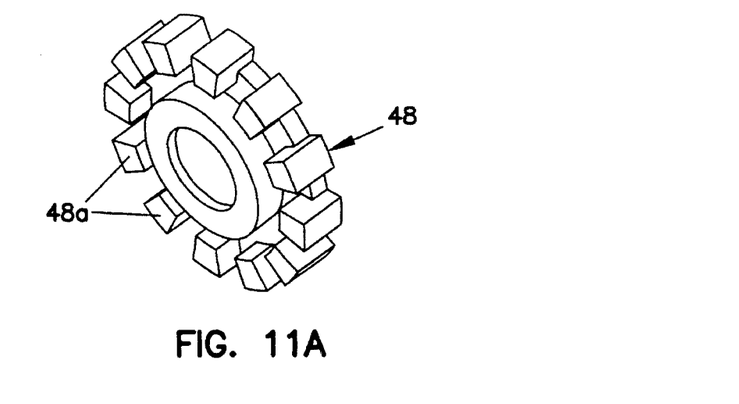
FIGS. 11A, 11B, 11C are perspective, sectional, and diagrammatic views, respectively, of an embodiment of a magnetic disc utilized with the embodiment of the clutch shown in FIG. 1.
Figure 11B:
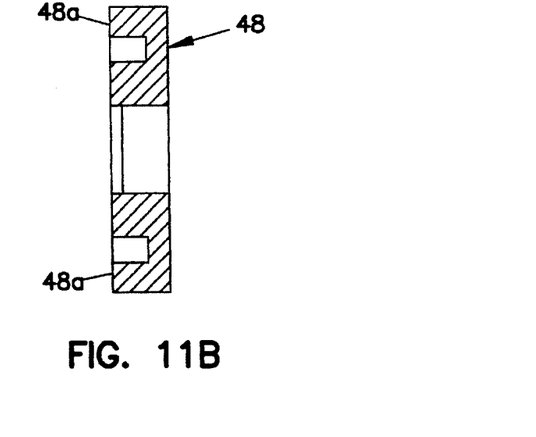
Figure 11C:
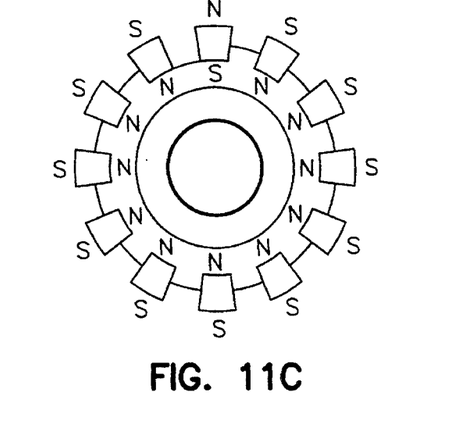

Integral with the control circuit 45 and substantially in the same vertical plane as the magnetic regions 48a of the disc member 48 is a sensor 59 for sensing the presence of a magnetic field. In the embodiment shown, the gap between the magnetic region 48a aligned with the sensor 59 and the sensor 59 is 0.035 inches. In a preferred embodiment, the sensor 59 is a hall effect sensor (UGN3235K manufactured by Allegro Microsystems, Inc. of Worcester, Mass.). This sensor is activated by a 175 gauss max magnetic field. It will be appreciated that other types of sensors, such as optical sensors, etc. might be used to sense the angular position of the driven shaft 49. As noted, in the preferred embodiment the sensor 59 is an integral part of the control circuit 45. However, the sensor 59 or other sensing devices might be located remotely of the control circuit 45 in other embodiments of the invention.

In the preferred embodiment as diagrammatically illustrated in FIG. 11C, one of the magnets is a north pole magnet and the other magnets are south pole magnets. The north pole magnet serves as a home position indicator. In the embodiment shown there are twelve of the magnetic regions 48a present. However, it will be appreciated that any number of magnetic regions might be used. Indeed, there might be only one magnetic region 48a present, in which case there would be no need for a special home position indicator.

Figure 12:
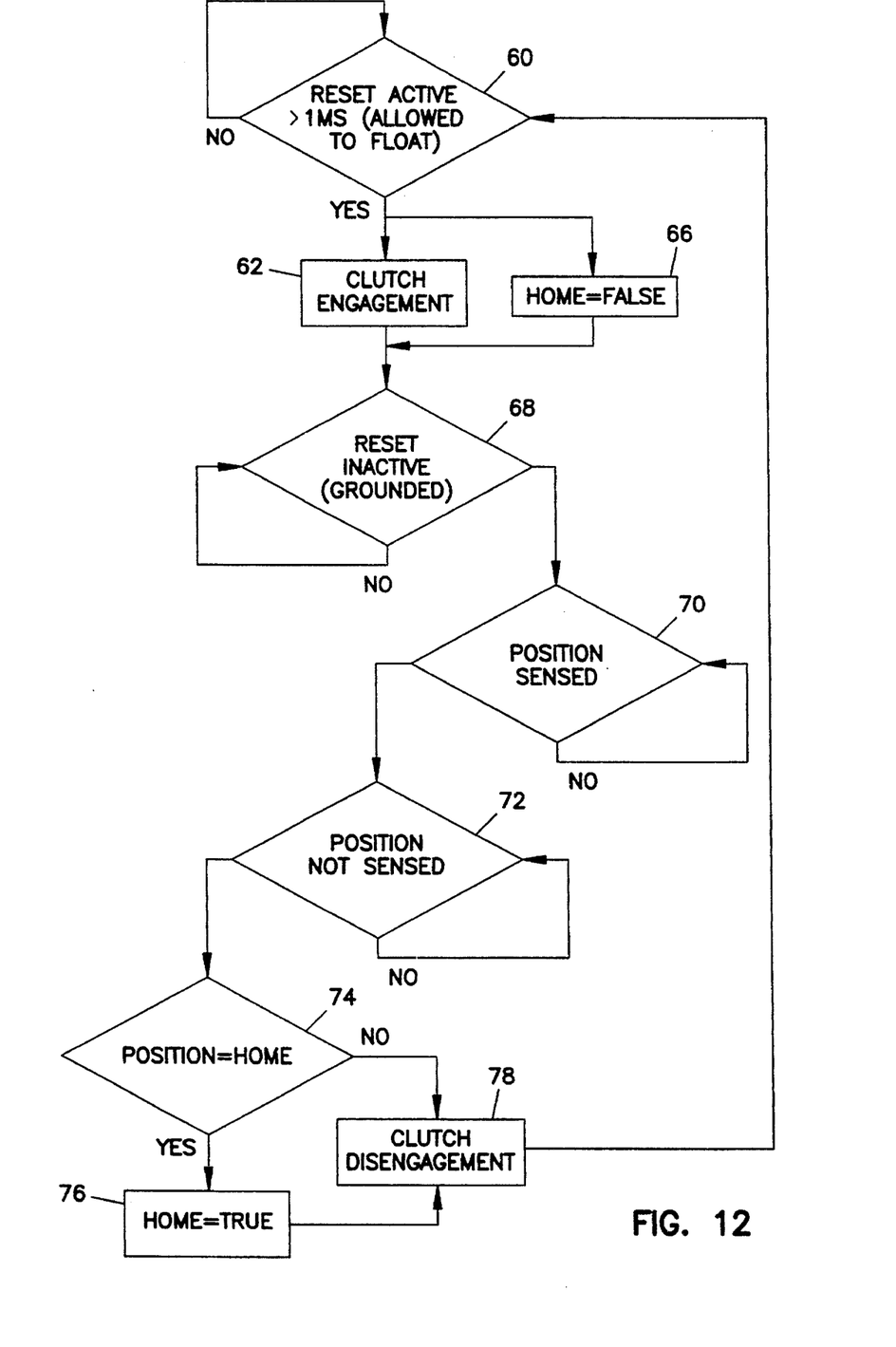
FIG. 12 is flow diagram illustrating operation of the clutch apparatus and its control circuitry.

Referring now to FIG. 12, operation of the control circuitry 45 will now be explained. At step 60 a reset signal is sent (signal line goes high for at least one millisecond) from a remote master controller to the control circuit 45 to actuate (engage) the clutch 42, represented by step 62, and cause the driven shaft 49 to be rotated by the clutch 42. The control circuit then sets at step 66 the home position to false. At step 68, the control circuit waits until the reset signal is inactive. If the reset signal is still active (high), the control circuit 45 does not react to the next angular position sensed by the sensor 59. If the reset signal is no longer active (low), the control circuit than can react to the next angular position sensed by the sensor 59. If the next angular position is sensed at step 70, the control circuit 45 waits at step 72 until the position is no longer sensed (when the magnet being sensed has rotated past the sensor 59). Once the position is no longer sensed, the control circuit checks if this is the home position at step 74 and if it is, the home flag is set at step 76. Regardless of whether at the home position or not, the clutch 42 is also disengaged (stopped) at step 78. The control circuit 45 then waits for the next reset signal at step 60.

As shown in FIG. 5, the home position is determined by the sensor 59 detecting the north pole magnet at which time pin three (3) output from the sensor 59 goes low. If a south pole magnet is detected, pin two (2) from the sensor 59 goes low. It will be appreciated that various other apparatus and methods of home detection might be utilized in keeping with the principles of the invention. For example, home detection might be accomplished using multiple sensors, multiple gauss levels, linear hall devices, varying sizes of magnetic fields, etc. Optical sensors might be used to sense a different sized slot in a disk, etc.

Figure 13:
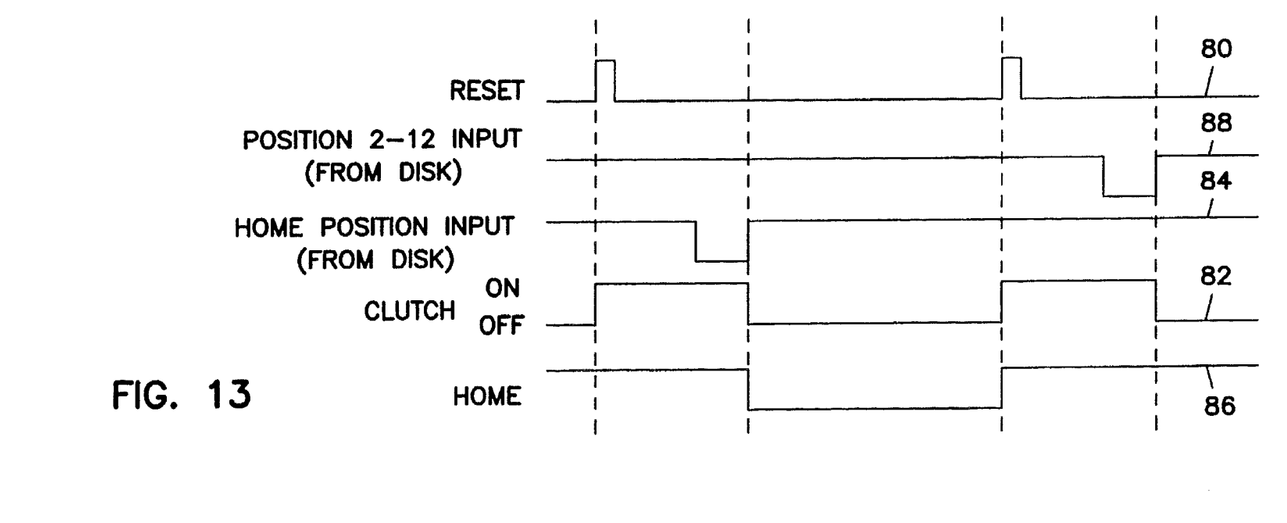
FIG. 13 is a signal timing diagram illustrating operation of the clutch apparatus and its control circuitry.

FIG. 13 further illustrates the status of the various control lines during operation of the clutch 40. When the reset signal (line 80 is allowed to float high for one millisecond) is received by the control circuitry via connector pin 4 from the remote master control unit 47, the clutch 42 is actuated or engaged by the control circuit 45 sending an energizing current (line 82 high) to the electromagnetic coil of the clutch. Even though the home position signal (line 84 going low) is sensed from the sensor 59, the control circuit 45 continues to energize the clutch 42 until such time as the home position signal is no longer present, at which time the energization current is switched off. The home signal line 86 to the remote master control is then pulled low indicating the clutch is at the home position. The home signal line remains low until such time as the next reset signal is received from the remote master controller at which time the home signal line 86 goes high indicating the clutch 42 is no longer at the home position. In addition, the clutch is energized or activated. Upon detection of a south pole magnet, the line 88 from pin 2 of the sensor 59 goes low indicating detection of the next indexed position or magnet. The clutch continues to be energized until the south pole magnet is no longer sensed as is indicated by the line 88 going high. At his time the clutch is deenergized or deactivated so as to stop movement of the driven shaft and the control circuit 45 awaits the next reset signal from the remote master control circuitry.

Having read the foregoing description, it is to be understood, that even though numerous characteristics and advantages of various embodiments in accordance with the principles of the invention have been set forth in the foregoing description, together with details of the structure and function of the invention, the disclosure is illustrative only, and changes may be made in detail, especially matters of shape, size and arrangement of the parts within the principles of the invention to the full extent indicated by the broad general meaning of the term in which the appended claims are expressed.

What is claimed is:

1. A motion control device comprising:

an electromagnetically actuated clutch assembly adapted to selectively engage and disengage a rotatable output member;

a control circuit integral to the clutch assembly for controlling when the clutch assembly engages and disengages the output member; and a sensor integral to the clutch assembly and adapted to interface with the control circuit, the sensor being arranged at a predetermined location for sensing angular positions of the output member, wherein the control circuit and the sensor cooperate to index the angular positions of the output member.

2. An apparatus in accordance with claim 1, wherein one or more spaced apart magnetic regions are disposed proximate a periphery of a magnetic member attached to the output member of the clutch apparatus for rotation therewith, the magnetic regions being sensed by the sensor to generate output member positioning information that is used by the control circuit to control when the clutch assembly disengages the output member.

3. An apparatus in accordance with claim 2, wherein a first one of the one or more magnetic regions has a polarity opposite that of a remainder of the magnetic regions, the first one of the magnetic regions indicating a home position.

4. An apparatus in accordance with claim 3, wherein the sensor is a hall effect sensor.

5. An apparatus in accordance with claim 1, wherein the clutch is a spring wrap electromagnetic clutch.

6. An electromagnetically actuated clutch apparatus having an electromagnetic coil, comprising:

control circuit means for engaging/disengaging the clutch, the control circuit means being electrically connected to the electromagnetic coil for energizing and de-energizing the coil and including electrical contacts for electrical connection to a remote master control unit, the control circuit means including a circuit board being disposed in a housing on the clutch;

a magnetic field sensor means integral with the control circuit means and disposed in the housing for providing signals to the control circuit means representative of a sensed angular position of a rotatable output member; and a plurality of spaced apart magnetic regions mounted proximate a periphery of a disk member attached to the output member of the clutch apparatus for rotation therewith, the magnetic regions being configured so as to be sensed by the magnetic field sensor to indicate the sensed angular position of the output member, a first one of the magnetic regions having a polarity opposite that of a remainder of the magnetic regions, the first one of the magnetic regions indicating a home position.

7. A method for engaging and disengaging an electromagnetically actuated clutch, the method comprising the steps of:

engaging the clutch by sending a first signal to control circuitry integral with the clutch whereby the control circuitry energizes the electromagnetic clutch causing the clutch to engage an output member;

sensing magnetic fields created by a plurality of spaced apart magnetic regions disposed at fixed, angularly spaced apart positions about the output member, wherein each magnetic region is representative of an angular position of the output member; and disengaging the clutch by sending a second signal to the integral control circuitry when one of the angular positions of the output member is sensed, whereby the control circuitry de-energizes the electromagnetic clutch causing the clutch to disengage the output member.

8. A method in accordance with claim 7, including the step of sensing the angular position of a shaft driven by the clutch when engaged.

9. A method in accordance with claim 8, including the step of sensing magnetic fields created by a plurality of spaced apart magnetic regions disposed at fixed, angularly spaced apart positions about the driven shaft.

10. A method in accordance with claim 9, including the step of sensing and differentiating between magnetic fields of different polarity.

11. A method in accordance with claim 10, including the step of the control circuitry generating a home signal representative of the driven shaft being at a home position.

12. A motion control unit comprising:

a rotatable shaft;

a disk member connected to the shaft for rotation therewith;

an electromagnetically actuated clutch assembly adapted to selectively engage and disengage the shaft, the clutch assembly including a coil housing adapted to contain an electromagnetic coil, the coil housing including a unitarily formed control circuit housing;

a control circuit contained within the control circuit housing and adapted to be electrically connected to the electromagnetic coil for controlling when the clutch assembly engages and disengages the shaft; and a sensor contained within the control circuit housing and positioned proximate a periphery of the disk member, the sensor being arranged to sense an angular position of the disk member and to interface with the control circuit, wherein the sensor and disk member cooperate to generate shaft positioning information that is used by the control circuit to control when the clutch assembly disengages the shaft.

* * * * *